US012325088B2

(12) United States Patent
Ko et al.

(10) Patent No.: US 12,325,088 B2
(45) Date of Patent: Jun. 10, 2025

(54) HEAD ASSEMBLY FOR MOUNTING CONDUCTIVE BALL

(71) Applicant: PROTEC CO., LTD., Gyeonggi-do (KR)

(72) Inventors: Youn Sung Ko, Gyeonggi-do (KR); Yoshiaki Yukimori, Kanagawa (JP); Geunsik Ahn, Seoul (KR)

(73) Assignee: PROTEC CO., LTD., Gyeonggi-do (KR)

( * ) Notice: Subject to any disclaimer, the term of this patent is extended or adjusted under 35 U.S.C. 154(b) by 12 days.

(21) Appl. No.: 18/346,838

(22) Filed: Jul. 4, 2023

(65) Prior Publication Data

US 2024/0009747 A1 Jan. 11, 2024

(30) Foreign Application Priority Data

Jul. 5, 2022 (KR) .................. 10-2022-0082498

(51) Int. Cl.
*B23K 3/00* (2006.01)
*B23K 3/06* (2006.01)

(52) U.S. Cl.
CPC .......... *B23K 3/0653* (2013.01); *B23K 3/0623* (2013.01)

(58) Field of Classification Search
CPC .. B23K 3/0653; B23K 3/0623; B23K 1/0016; H01L 21/4825; H01L 21/4853; H01L 24/75; H01L 2224/75621; H01L 2224/75841
USPC ........................... 228/180.22, 245–246, 56.3
See application file for complete search history.

(56) References Cited

U.S. PATENT DOCUMENTS

| 5,279,045 A * | 1/1994 | Odashima | H01L 24/11 34/558 |
| 5,626,277 A * | 5/1997 | Kawada | B23K 3/0623 228/41 |
| 6,186,389 B1 | 2/2001 | Nakajima et al. | |
| 6,279,816 B1 | 8/2001 | Nakajima et al. | |
| 8,387,236 B2 | 3/2013 | Nebashi et al. | |
| 2003/0111508 A1* | 6/2003 | Cobbley | B23K 3/0623 228/41 |
| 2009/0008433 A1* | 1/2009 | Sakaguchi | H05K 3/3478 228/41 |
| 2010/0272884 A1* | 10/2010 | Igarashi | H01L 24/742 118/301 |
| 2015/0001278 A1* | 1/2015 | Lee | B23K 3/0623 228/41 |

FOREIGN PATENT DOCUMENTS

| CN | 101132690 A | * | 2/2008 | ........... B23K 3/0623 |
| JP | 2005093838 A | * | 4/2005 | ........... H01L 21/561 |

(Continued)

*Primary Examiner* — Kiley S Stoner
(74) *Attorney, Agent, or Firm* — JCIPRNET (57) ABSTRACT

According to a head assembly for mounting conductive balls of the disclosure, a gas flow for moving the conductive balls in a downward direction is formed in a chamber, and thus, small and light-weight conductive balls may be effectively mounted in mounting recesses of a mask. Also, because the head assembly for mounting the conductive balls is operated in the manner of inducing the conductive balls to move in a direction in which the mounting recesses are formed, the conductive balls may be rapidly and thoroughly mounted in the plurality of mounting recesses formed in the mask.

16 Claims, 9 Drawing Sheets

(56) References Cited

FOREIGN PATENT DOCUMENTS

| | | | | |
|---|---|---|---|---|
| JP | 2009032719 A | * | 2/2009 | ........... B23K 1/0016 |
| JP | 5240776 | | 7/2013 | |
| KR | 20100117032 A | * | 11/2010 | |
| KR | 20140030293 A | * | 3/2014 | |
| KR | 20150001205 A | * | 1/2015 | |
| KR | 20150012335 A | * | 2/2015 | |
| KR | 101502150 | | 3/2015 | |
| KR | 101550688 | | 9/2015 | |
| KR | 101576722 | | 12/2015 | |
| KR | 20160006460 A | * | 1/2016 | |
| KR | 101647660 | | 8/2016 | |
| KR | 101668960 | | 11/2016 | |
| KR | 101752202 | | 6/2017 | |
| KR | 101752202 B1 | * | 6/2017 | |
| KR | 20190074699 A | * | 6/2019 | |
| WO | WO-2015126155 A1 | * | 8/2015 | ........... H01L 23/488 |

* cited by examiner

HEAD ASSEMBLY FOR MOUNTING CONDUCTIVE BALL

CROSS-REFERENCE TO RELATED APPLICATION

This application is based on and claims priority under 35 U.S.C. § 119 to Korean Patent Application No. 10-2022-0082498, filed on Jul. 5, 2022, in the Korean Intellectual Property Office, the disclosure of which is incorporated by reference herein in its entirety.

BACKGROUND

1. Field

One or more embodiments of the present disclosure relate to a head assembly for mounting conductive balls, and in particular, to a head assembly for mounting conductive balls, the head assembly mounting conductive balls in mounting recesses formed in a mask so that the conductive balls may be mounted on an electrode of a substrate.

2. Description of the Related Art

A conductive ball such as a solder ball may be frequently used for electric connection when a semiconductor apparatus, such as a large-scale integration (LSI), a liquid crystal display (LCD), etc. is mounted.

A conductive ball of a fine particle type having a diameter of 1 mm or less is loaded on a substrate to be used in an electric mounting of the substrate. To this end, a mask having mounting recesses is mainly used. Conductive balls are mounted in mounting recesses formed in a mask while the mask is disposed on a substrate, or conductive balls are mounted in the mounting recesses of the mask separately from the substrate and then are transferred to be attached to the substrate.

Recently, a conductive ball has reduced to a size of tens to hundreds of micrometers and a substrate has been integrated, and thus, the number of conductive balls to be mounted in a unit area also increases.

However, when the size of the conductive ball is reduced and a weight of the conductive ball is also reduced, there may be a difficulty in mounting the conductive balls on the mask in the manner according to the related art.

Figure 1:
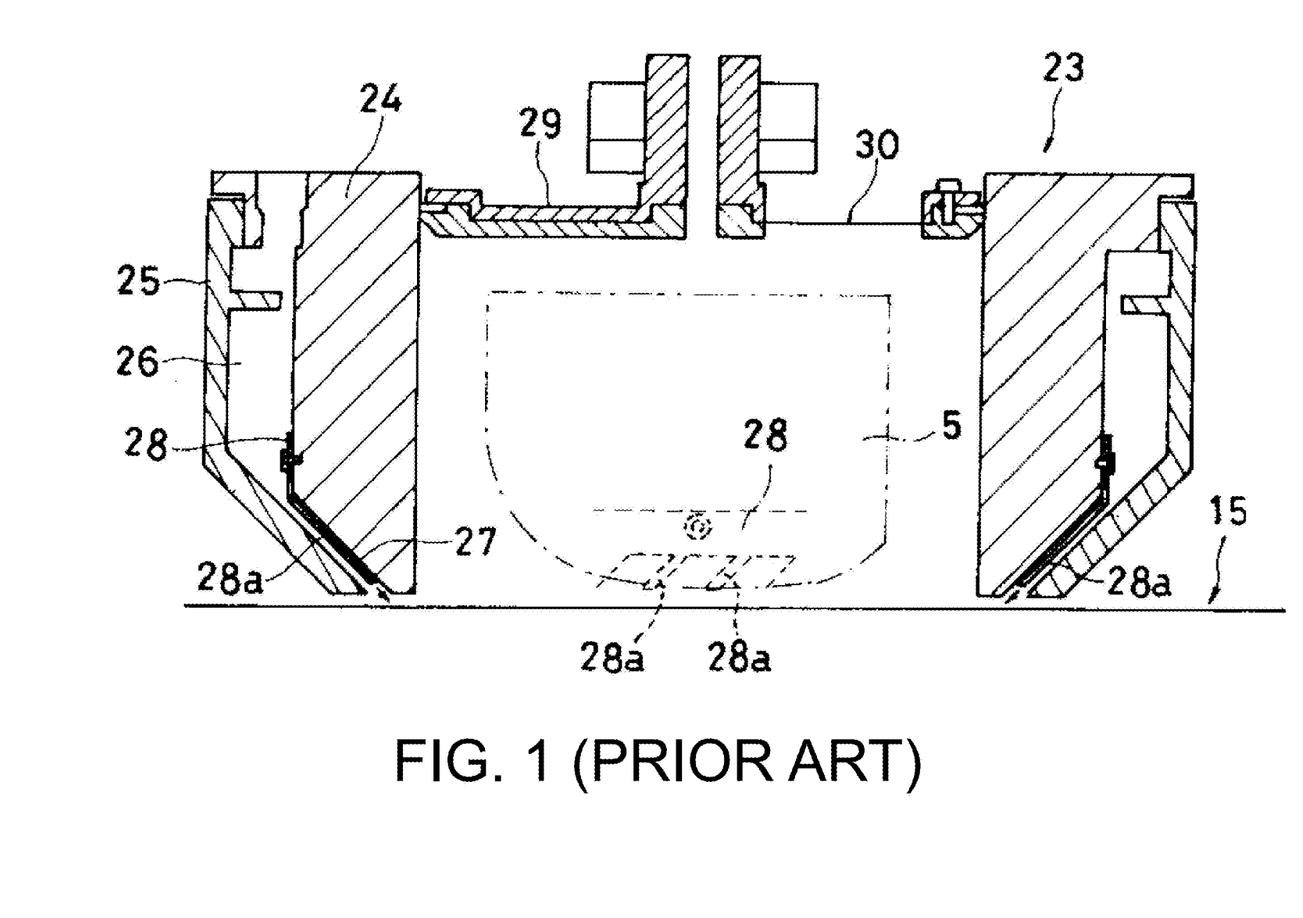
FIG. 1 is a diagram for describing a structure of a head assembly for mounting conductive balls, according to the related art.

Japanese Laid-open Patent No. 2010-177230 discloses a ball supply apparatus as shown in FIG. 1. Such above ball supply apparatus is generally referred to as a "cyclone head". The cyclone head according to the related art has a structure, in which an air flow in the form of a whirlwind-type is formed by fins 28a in a chamber while conductive balls are accommodated in the chamber of a cylindrical shape. However, in the case of the cyclone head according to the related art, when a very fast air flow in the whirlwind-type is generated in the chamber like a tornado, movements of the conductive balls are aroused in a direction parallel to an upper surface of the mask. The mounting recesses of the mask are formed in a vertical direction and the conductive balls mainly move in a horizontal direction, and thus, an efficiency of mounting the conductive balls is not high enough. In particular, when the size and weight of the conductive ball are reduced, a phenomenon that the conductive balls may float upward in the chamber occurs similarly to the tornado or spout. That is, the conductive balls are not moved in the direction toward the mounting recess in the mask located at the lower side, but are moved upward, that is, the opposite direction. It is difficult to efficiently perform the conductive ball mounting process with the cylindrical cyclone head according to the related art.

Also, according to the cyclone head having the cylindrical shape of the related art as shown in FIG. 1, the conductive balls are concentrated at the center of the head, rather than evenly distributed in the head, and thus, a productivity of a conductive ball mounting process on the mask degrades. That is, because an area of an effective region in which the conductive balls are concentrated is relatively small, when an operation of mounting the conductive balls on a mask having a relatively large area is performed, it takes a lot of time to pass through the entire area of the mask with the narrow effective area.

Therefore, an apparatus capable of effectively mounting conductive balls in mounting recesses of a mask is necessary. Also, even when conductive balls have small size and light weight, an apparatus capable of mounting conductive balls thoroughly in all mounting recesses of a mask rapidly and accurately is also necessary.

SUMMARY

The present disclosure provides a head assembly for mounting conductive balls, the head assembly being capable of rapidly and accurately mounting small and light-weight conductive balls in all mounting recesses of a mask.

Additional aspects will be set forth in part in the description which follows and, in part, will be apparent from the description, or may be learned by practice of the presented embodiments of the disclosure.

To achieve the objective, the present disclosure provides a head assembly for mounting conductive balls, which mounts the conductive balls in mounting recesses in a mask while being transported with respect to an upper surface of the mask in which the mounting recesses are formed, including: a head body including a first wall member and a second wall member which are arranged to face each other and extend in parallel to each other, a first connection member and a second connection member which connect both ends of the first wall member to both ends of the second wall member, a central chamber formed by being surrounded by the first wall member, the second wall member, the first connection member, and the second connection member so that the conductive balls stay therein, and a cover member covering an upper side of the central chamber; a first main nozzle extending along a lengthwise direction of the first wall member on a lower portion of the first wall member so as to eject a compressed gas to a lower side in the central chamber; and a second main nozzle extending along a lengthwise direction of the second wall member on a lower portion of the second wall member so as to eject a compressed gas to a lower side in the second wall member.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a head assembly for mounting conductive balls according to one or more embodiments of the present disclosure is described in detail later with reference to accompanying drawings.

Figure 2:
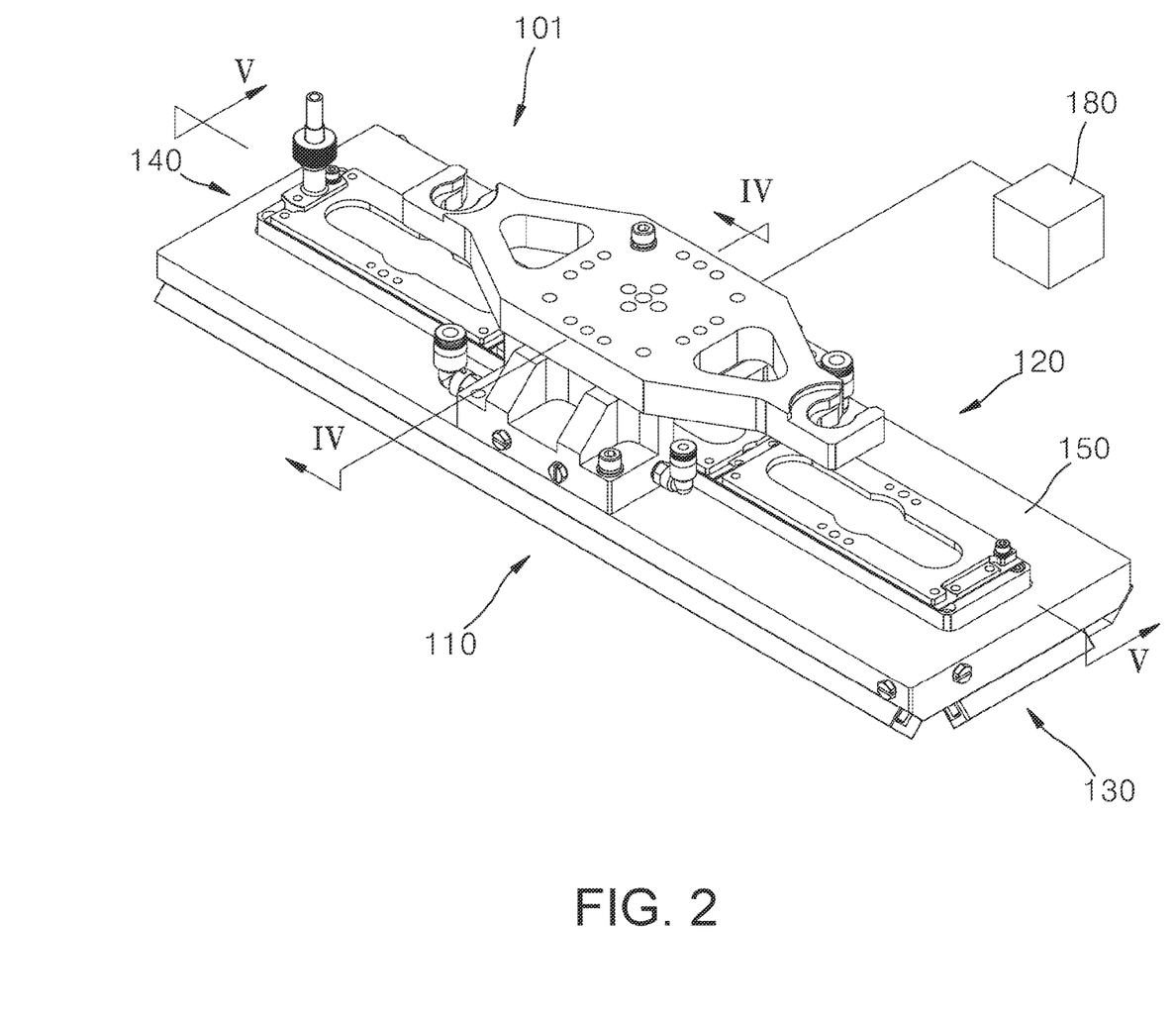
FIG. 2 is a perspective view of a head assembly for mounting conductive balls, according to a first embodiment of the present disclosure.
Figure 3:
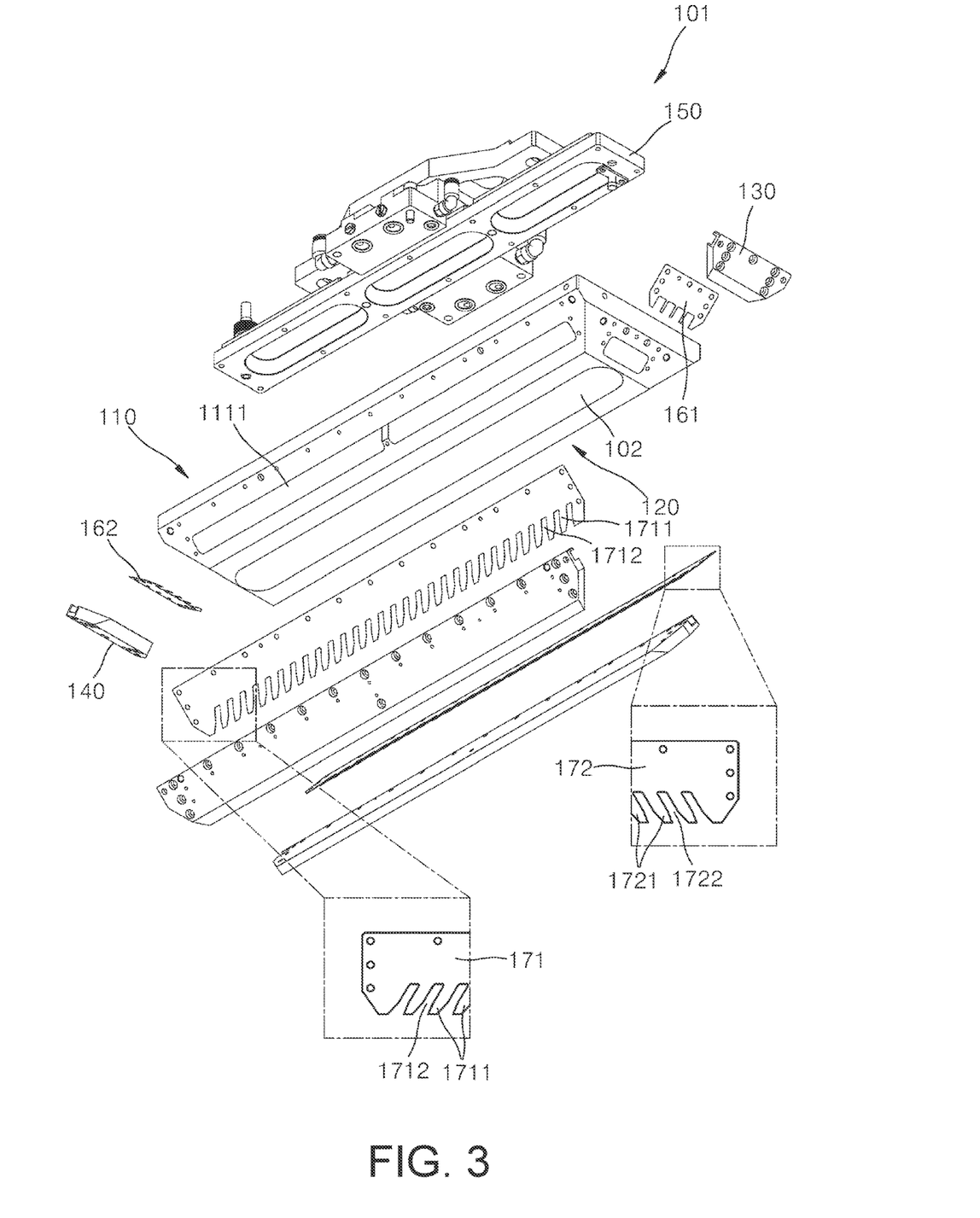
FIG. 3 is an exploded perspective view of the head assembly for mounting conductive balls shown in FIG. 2.
Figure 4:
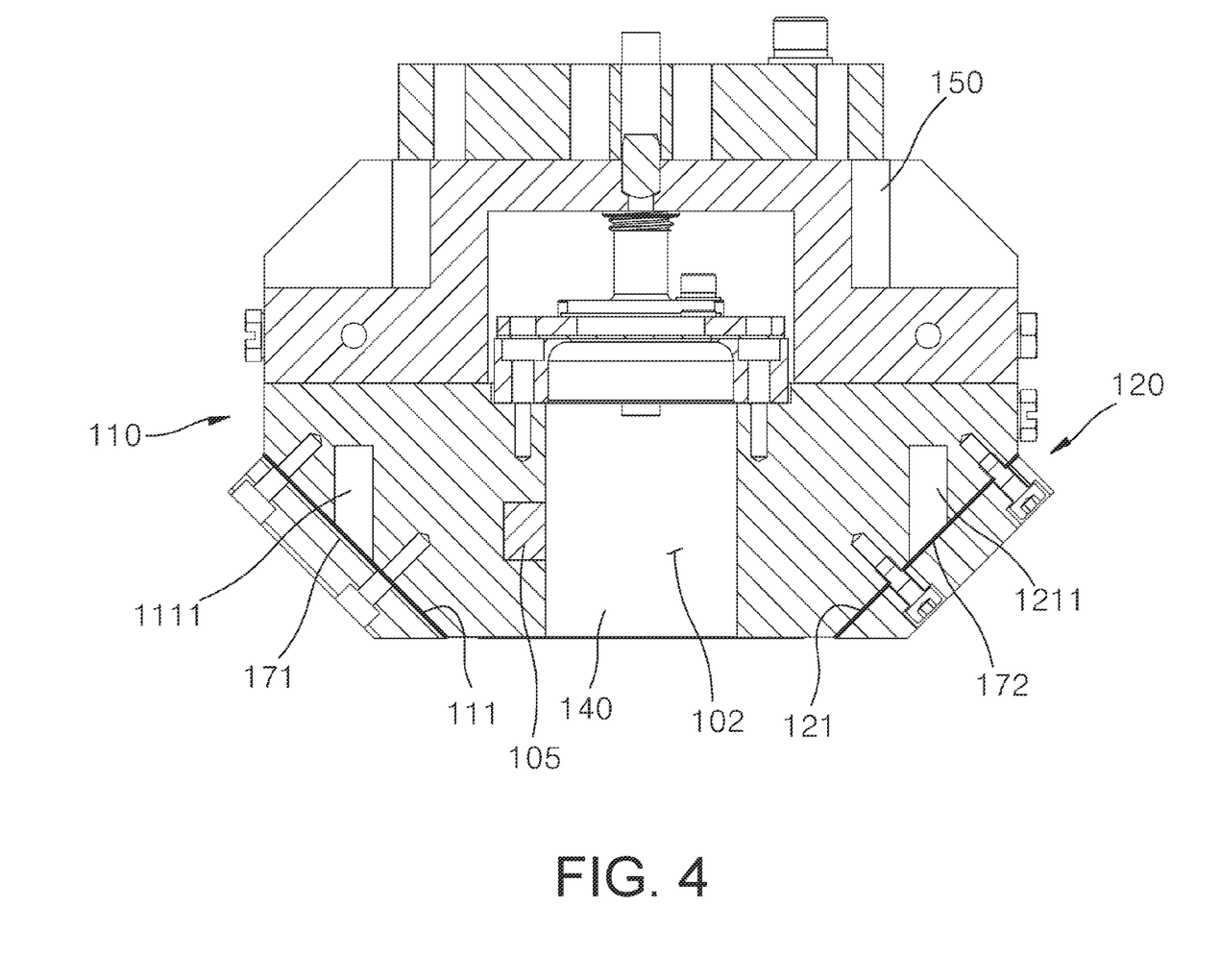
FIG. 4 is a cross-sectional view of the head assembly for mounting conductive balls, taken along line IV-IV of FIG. 2.
Figure 5:
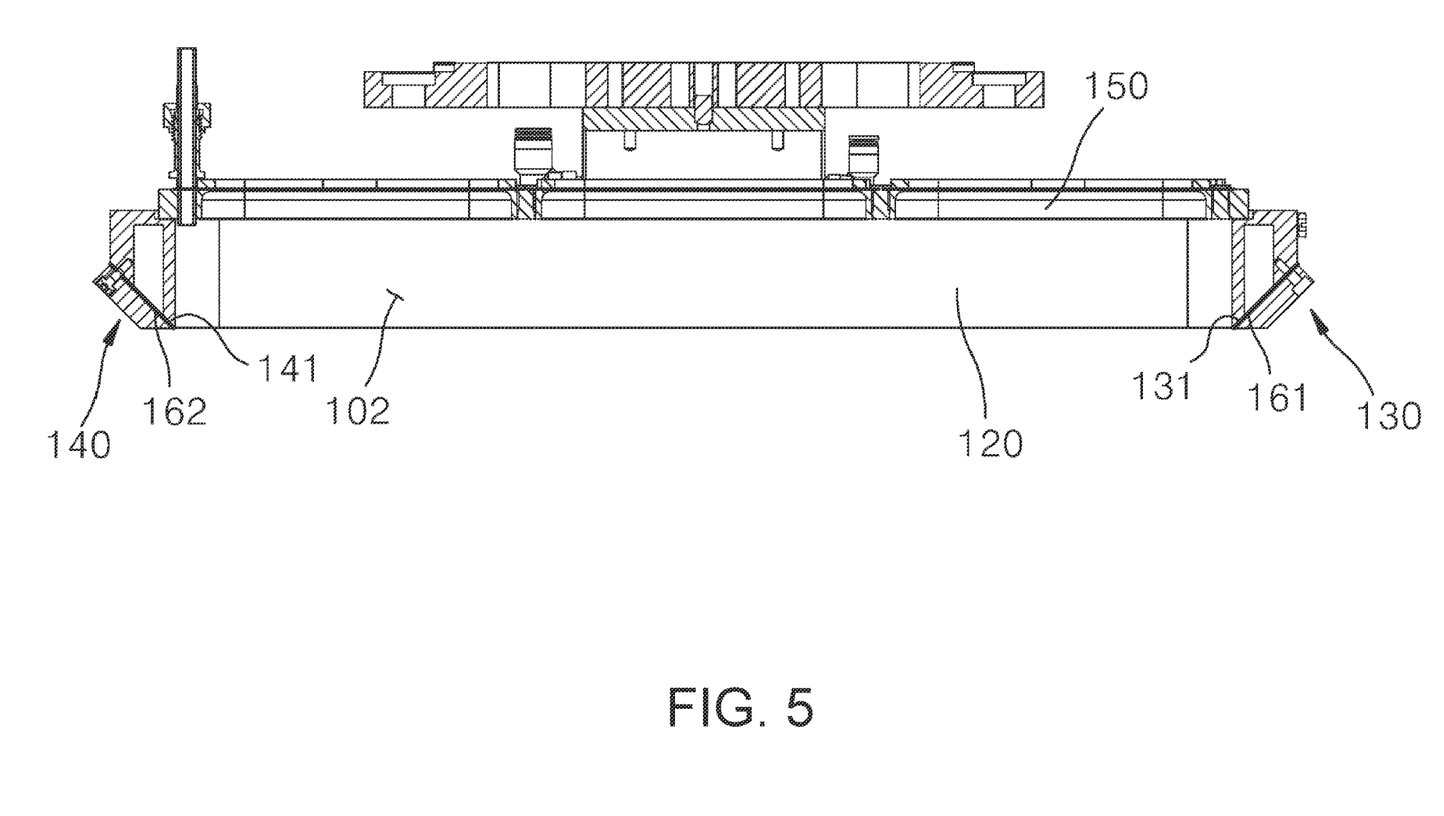
FIG. 5 is a cross-sectional view of the head assembly for mounting conductive balls, taken along line V-V of FIG. 2.

FIG. 2 is a perspective view of a head assembly for mounting conductive balls, according to a first embodiment of the present disclosure, FIG. 3 is an exploded perspective view of the head assembly for mounting conductive balls shown in FIG. 2, FIG. 4 is a cross-sectional view of the head assembly for mounting conductive balls, taken along line IV-IV of FIG. 2, and FIG. 5 is a cross-sectional view of the head assembly for mounting conductive balls, taken along line V-V of FIG. 2.

Referring to FIGS. 2 to 5, the head assembly for mounting conductive balls according to the embodiment includes a head body 101, a first main nozzle 111, and a second main nozzle 121.

The head body 101 includes a first wall member 110, a second wall member 120, a first connection member 130, a second connection member 140, a central chamber 102, and a cover member 150.

The first wall member 110, the second wall member 120, the first connection member 130, and the second connection member 140 are connected to one another to form an outer circumference surrounding the central chamber 102, and the cover member 150 may be formed to cover an upper portion of the central chamber 102. Conductive balls for being mounted in mounting recesses of a mask are accommodated and stay in the central chamber 102.

The first wall member 110 and the second wall member 120 are arranged to face each other and are formed to extend in parallel to each other in a horizontal direction. The first connection member 130 and the second connection member 140 may respectively connect both ends of the first wall member 110 to both ends of the second wall member 120.

The first main nozzle 111 is formed to extend along the lengthwise direction of the first wall member 110 on the lower portion of the first wall member 110, so as to eject a compressed gas to the lower side in the central chamber 102. In the embodiment, the first main nozzle 111 is formed to be in communication with the lower surface of the first wall member 110.

The second main nozzle 121 is formed to extend along the lengthwise direction of the second wall member 120 on the lower portion of the second wall member 120, so as to eject the compressed gas to the lower side in the central chamber 102. In the embodiment, the second main nozzle 121 is formed to be in communication with the lower surface of the second wall member 120, so that the compressed gas may be ejected to the boundary between the lower surface and the inner wall surface of the second wall member 120.

Referring to FIG. 4, the first main nozzle 111 is formed to be inclined in a direction closer to the central chamber 102, toward the lower side of the first wall member 110. Due to the inclined structure of the first main nozzle 111, the conductive balls that are adjacent to the inner wall of the first wall member 110 are guided to move in a direction away from the first wall member 110 (that is, toward the central chamber 102).

Like the first main nozzle 111, the second main nozzle 121 is also formed to be inclined in a direction closer to the central chamber 102, toward the lower side of the second wall member 120.

In the embodiment, the first main nozzle 111 and the second main nozzle 121 are formed to be inclined in opposite directions, and inclined angles of the first main nozzle 111 and the second main nozzle 121 with respect to the first wall member 110 and the second wall member 120 are the same as each other.

A plurality of first guide recesses 1712 and a plurality of second guide recesses 1722 are formed in the first main nozzle 111 and the second main nozzle 121, respectively. The first guide recesses 1712 and the second guide recesses 1722 guide ejecting directions of the compressed gas ejected respectively from the first main nozzle 111 and the second main nozzle 121. In the embodiment, the first guide recesses 1712 and the second guide recesses 1722 are respectively formed to be arranged at certain intervals along the directions in which the first wall member 110 and the second wall member 120 extend.

Also, in the embodiment, the plurality of first guide recesses 1712 and second guide recesses 1722 are respectively formed by a first guide member 171 and a second guide member 172 that are respectively arranged in the first main nozzle 111 and the second main nozzle 121. The first guide member 171 and the second guide member 172 respectively include a plurality of first guide pins 1711 and a plurality of second guide pins 1721. The first guide recesses 1712 are formed between the plurality of first guide pins 1711, and the second guide recesses 1722 are formed between the plurality of second guide pins 1721.

The plurality of first guide pins 1711 are formed to be inclined so as to proceed in the direction in which the first wall member 110 extends (lengthwise direction), toward the lower side of the first wall member 110, and the plurality of second guide pins 1721 are formed to be inclined so as to proceed in the direction in which the second wall member 120 extends (lengthwise direction), toward the lower side of the second wall member 120. Due to the first guide pins 1711 and the second guide pins 1721, the compressed gas ejected from each of the first main nozzle 111 and the second main nozzle 121 is ejected in a direction that is inclined, not perpendicular to, with respect to the lengthwise direction of the first wall member 110 and the second wall member 120.

In the embodiment, the plurality of first guide recesses 1712 and the plurality of second guide recesses 1722 formed by the first guide pins 1711 and the second guide pins 1721 are formed to be inclined in opposite directions to each other as shown in FIG. 3, and the inclined angles thereof are the same as each other.

In addition, the first wall member 110 and the second wall member 120 have a first flow path 1111 and a second flow path 1211 formed therein, and the first flow path 1111 and the second flow path 1211 are respectively connected to the first main nozzle 111 and the second main nozzle 121. A pressure of the compressed gas supplied to the first flow path 1111 and the second flow path 1211 is controlled by a controller 180. In the embodiment, the controller 180 controls the compressed gas supplied to the first flow path 1111 and the compressed gas supplied to the second flow path 1211 to have different pressures from each other. That is, the controller 180 maintains the pressure of the compressed gas supplied to the first flow path 1111 to be greater than that of the compressed gas supplied to the second flow path 1211.

The first connection member 130 and the second connection member 140 connecting the first wall member 110 to the second wall member 120 also respectively have a first connection main nozzle 131 and a second connection main nozzle 141. Like the first main nozzle 111 and the second main nozzle 121 described above, the first connection main nozzle 131 and the second connection main nozzle 141 respectively extend on the lower portions of the first connection member 130 and the second connection member 140 along the directions in which the first connection member 130 and the second connection member 140 extend, so that the compressed gas may be ejected respectively to the lower side in the first connection member 130 and the second connection member 140. Also, the first connection main nozzle 131 and the second connection main nozzle 141 are formed to be inclined in the direction closer to the central chamber 102, toward the lower portions of the first connection member 130 and the second connection member 140, respectively.

The first connection main nozzle 131 and the second connection main nozzle 141 may be formed to be connected or not to be connected to the first main nozzle 111 and the second main nozzle 121.

Referring to FIG. 3, a first connection guide member 161 and a second connection guide member 162 are arranged in the first connection main nozzle 131 and the second connection main nozzle 141, and the first connection guide member 161 and the second connection guide member 162 are formed similarly to the first guide member 171 and the second guide member 172.

The first connection member 130 and the second connection member 140 respectively have concavely curved inner wall surfaces that come into contact with the central chamber 102, as shown in FIG. 3.

The controller 180 constantly maintains the pressure of the compressed air supplied to the first connection main nozzle 131 and the second connection main nozzle 141.

An ionizer 105 may be installed on an inner wall surface of a component such as the central chamber 102, the first wall member 110, and the second wall member 120, etc., or on the flow path of the compressed gas. When the process of mounting conductive balls is performed by using conductive balls having very small sizes and light weight, the conductive balls may stick to the components such as the inner wall surface of the central chamber or the mask due to static electricity. Here, the controller 180 or the ionizer 105 described above may be operated to remove the static electricity, the quality and productivity in the conductive ball mounting process may be improved.

Hereinafter, operations of the head assembly for mounting conductive balls according to the first embodiment are described below.

The controller 180 controls the compressed gas to be supplied constantly at a set pressure respectively to the first main nozzle 111, the second main nozzle 121, the first connection main nozzle 131, and the second connection main nozzle 141, by using a mechanical component such as a pneumatic regulator. The compressed gas may include air or nitrogen gas. Other gases than the air and the nitrogen gas may be supplied through the nozzles.

Here, as described above, the controller 180 constantly maintains the pressure of the compressed gas supplied to the first flow path 1111 to be greater than that of the compressed gas supplied to the second flow path 1211, and controls the pressure of the compressed gas ejected through the first main nozzle 111 to be greater than that of the compressed gas ejected through the second main nozzle 121.

As described above, the first main nozzle 111, the second main nozzle 121, the first connection main nozzle 131, and the second connection main nozzle 141 are formed to be inclined in the direction closer to the central chamber 102 toward the lower sides thereof, and thus, the compressed gas ejected from each nozzle forms a flow of the gas toward the central chamber 102. That is, when the head assembly for mounting conductive balls according to the embodiment is arranged to be adjacent to the mask, the gas flow is generated between the mask and the lower surface of the head assembly for mounting conductive balls, and thus, the gas flow is generated toward the inside of the central chamber 102 between the lower surface of each of the first wall member 110, the second wall member 120, the first connection member 130, and the second connection member 140 and the mask. Due to the flow of gas as described above, the conductive balls in the central chamber 102 stay in the central chamber 102 without leaking to the outside of the central chamber 102.

Because the first wall member 110 and the second wall member 120 are arranged parallel to each other and extend in the lengthwise direction and the compressed gases are respectively ejected from the first main nozzle 111 and the second main nozzle 121 in the lengthwise direction with the uniform pressure, the conductive balls may be evenly distributed in the central chamber 102 along the lengthwise direction of the central chamber 102. That is, the conductive balls are distributed in the form of a line extending lengthily in the central chamber 102. In the above state, when the head assembly for mounting conductive balls is horizontally transported in the direction perpendicular to the first wall member 110 and the second wall member 120, the process of mounting the conductive balls is performed while the conductive balls in the central chamber 102 cover the upper surface of the mask, which has a relatively large area. As described above, because the head assembly for mounting the conductive balls according to the embodiment has a structure that is extended lengthily in the rectangular shape, the conductive balls may be mounted effectively in every mounting recess rapidly, without omission, with respect to the upper surface of the mask having the relatively large area. That is, when the head assembly for mounting the conductive balls according to the embodiment is horizontally transported in the direction perpendicular to the lengthwise directions of the first wall member 110 and the second wall member 120, the process of mounting the conductive balls may be performed while covering the relatively large area of the mask with the head assembly for mounting the conductive balls of the embodiment. As described above, the head assembly for mounting the conductive ball according to the disclosure may have noticeably improved productivity as compared with the cyclone head shown in FIG. 1 according to the related art.

Also, as described above, the pressure in the first main nozzle 111 and the pressure in the second main nozzle 121 are set to be different from each other, that is, when the controller 180 maintains the pressure of the first main nozzle 111 to be greater than that of the second main nozzle 121, the flow of gas capable of further improving the efficiency of mounting the conductive balls is generated in the central chamber 102. That is, because the pressure in the first main nozzle 111 is greater than that of the second main nozzle 121, in the lower portion in the central chamber 102, the flow of gas moving in the direction from the first wall member 110 to the second wall member 120 is generated. As described above, the flow of gas moving toward the second wall member 120 in the lower portion of the central chamber 102 collides with the inner wall of the second wall member 120 and rises upward, and then, is moved toward the inner wall of the first wall member 110 along the cover member 150 in the upper portion of the central chamber 102. As described above, the flow of gas that collides with the first wall member 110 while moving toward the first wall member 110 in the upper portion of the central chamber 102 is moved downward after colliding with the inner wall of the first wall member 110. When the above processes continuously occur, the flow of gas that circulates about a virtual rotary shaft at a high velocity is generated in the central chamber 102, wherein the virtual rotary shaft extends in the direction parallel to the direction in which the first wall member 110 and the second wall member 120 extend (that is, horizontal direction). Accordingly, at the vicinity of the first wall member 110, the flow of gas strongly descending along the inner wall surface of the first wall member 110 (that is, the downdraft) is generated, and thus, a probability that the conductive balls are seated in the mounting recesses of the mask while descending along with the flow of gas is greatly increased. Also, the conductive balls descending at the vicinity of the first wall member 110 flow in the direction toward the second wall member 120 while being in close contact with the surface of the mask, and thus, during the process, the probability that the conductive balls are seated in the mounting recesses of the mask also increases.

In the head assembly for mounting the conductive balls described above with reference to FIG. 1 according to the related art, the flow of gas circulating about the rotary shaft extending in the vertical direction along the inner wall surface of the chamber formed in a cylindrical shape is generated, and thus, the actual efficiency of mounting the conductive balls in the mounting recesses of the mask degrades as compared with the embodiment of the disclosure. That is, in the head assembly for mounting the conductive balls described above with reference to FIG. 1 according to the related art, it is difficult to form the flow of conductive balls moving nearly in the perpendicular angle toward the surface of the mask.

However, according to the disclosure, due to the above-described structure and operations, the flow of gas in which the conductive balls move head-on toward the mask or the mounting recesses is effectively generated, and thus, the productivity of the conductive ball mounting process may be greatly improved. In particular, because the head structure in the head assembly for mounting the conductive balls is formed in a shape extending in the lengthwise direction thereof, the head assembly for mounting the conductive balls according to the disclosure may cover a larger area of the mask without changing a volume thereof as compared with the related art. As such, by using the head assembly for mounting the conductive balls according to the disclosure, the time taken to perform the conductive ball mounting process may be easily reduced.

In addition, as described above, when the head assembly for mounting the conductive balls is configured so that the compressed gas ejected from the first main nozzle 111 and the second main nozzle 121 may be ejected in the direction inclined with respect to the inner wall surfaces of the first wall member 110 and the second wall member 120 by the first guide member 171 and the second guide member 172, the performance of mounting the conductive balls may be further improved.

In this case, the flow of gas moving from the first wall member 110 toward the second wall member 120 in the lower portion of the central chamber 102 is formed in a diagonal direction that is inclined toward the direction in which the first wall member 110 extends. The flow of gas formed by the above passage increases a probability that the conductive balls come into contact with the upper surface of the mask. When crossing between the first wall surface and the second wall surface in an inclined direction, rather than in the perpendicular direction, a distance through which the conductive balls pass on the upper surface of the mask increases. Accordingly, the probability that the conductive balls would come into contact with the upper surface of the mask increases, and the probability of mounting the conductive balls in the mounting recesses also increases. Also, even when the pressure in the first main nozzle 111 and the pressure in the second main nozzle 121 are not uniform due to a certain factor along the lengthwise directions of the first wall member 110 and the second wall member 120, as shown in FIG. 3, the distribution of conductive balls in the central chamber 102 may be induced to be relatively uniform in the lengthwise direction thereof, due to the flow of gas in the diagonal direction formed by the first guide recesses 1712 and the second guide recesses 1722. According to the above method, the probability that the conductive balls will not be mounted in the mounting recesses in a certain region of the mask through which the head assembly for mounting the conductive balls according to the disclosure passes may be reduced. Also, when the flow of conductive balls in the diagonal direction is formed in the central chamber 102 due to the first guide recesses 1712 and the second guide recesses 1722, the flow of gas descending along the inner wall surface of the first wall member 110 is still maintained, and thus, the mounting performance is excellent because the conductive balls are moved head-on toward the mounting recesses due to the flow of gas.

The head assembly for mounting the conductive balls according to the first embodiment of the disclosure is described above, but the scope of the disclosure is not limited thereto.

For example, in the above description, the first guide pins 1711 and the second guide pins 1721 are formed to be inclined with respect to the direction in which the first wall member 110 and the second wall member 120 extend, but the first guide pins and the second guide pins may be formed in the direction perpendicular to the direction in which the first wall member and the second wall member extend, respectively. In this case, the first guide recesses and the second guide recesses formed by the first guide pins and the second guide pins are also formed in the direction perpendicular to the direction in which the first wall member and the second wall member extend.

Also, in the above description, the first guide recesses 1712 and the second guide recesses 1722 are formed respectively by the first guide member 171 and the second guide member 172, but the first guide recesses and the second guide recesses may be formed without using the first guide member 171 and the second guide member 172. That is, concavo-convex patterns may be respectively formed on the inner wall surfaces of the first main nozzle and the second main nozzle to generate the first guide recesses and the second guide recesses.

In some cases, a head assembly for mounting conductive balls having a structure in which the first guide recesses 1712 and the second guide recesses 1722 are not provided may be implemented.

Also, structures and shapes of the first guide recesses and the second guide recesses or the first guide member and the second guide member may be variously modified, in addition to the above-described structures.

Also, in the above description, the first main nozzle 111 and the second main nozzle 121 are formed to be inclined in the direction closer to the central chamber 102 toward the lower portions thereof, but the structures of the first main nozzle and the second main nozzle are not limited thereto. A head assembly for mounting conductive balls may be implemented so that the directions of the compressed gas ejected from the first main nozzle and the second main nozzle may be adjusted by using a separate structure, rather than the inclined structures of the first main nozzle and the second main nozzle.

Also, in the above description, the first main nozzle 111 and the second main nozzle 121 are formed to be in communication with the lower surfaces of the first wall member 110 and the second wall member 120, respectively. However, in some cases, a head assembly for mounting conductive balls, having a structure in which the first main nozzle and the second main nozzle are formed to be in communication with the wall surfaces of the first and second wall members at the central chamber side, may be implemented. In the above structure, the flow of conductive balls rapidly descending between the first wall member and the second member toward the mask may be generated as described above. Also, a head assembly for mounting conductive balls, having a structure in which the first main nozzle and the second main nozzle are formed to be respectively in communication with boundaries between the lower surfaces and the inner wall surfaces of the first wall member and the second wall member, may be implemented.

Also, the inclined angle of the first main nozzle with respect to the first wall member and the inclined angle of the second main nozzle with respect to the second wall member may be formed to be different from each other. As described above, descending movement of the conductive balls due to the rotation of the compressed gas in the central chamber may be induced by configuring different inclined angles of the first main nozzle and the second main nozzle. In particular, when the first main nozzle and the second main nozzle are configured to have different inclined angles, the downdraft may be induced in the central chamber even when the controller controls the compressed gases supplied to the first main nozzle and the second main nozzle to have the same pressure.

Also, in the above description, the controller 180 constantly maintains the pressure of the compressed gas supplied to the first flow path 1111 to be greater than that of the compressed air supplied to the second flow path 1211, but the controller may variously adjust the pressure in the first flow path and the pressure in the second flow path as necessary. The controller may adjust the pressure difference between the first flow path and the second flow path according to a direction in which the head assembly for mounting conductive balls is transported by a transport unit that horizontally transports the head assembly for mounting the conductive balls according to the disclosure. That is, the controller may adjust the pressure in the manner that the pressure in the first flow path is greater when the head assembly for mounting conductive balls is moved forward and the pressure in the second flow path is greater when the head assembly for mounting conductive balls is retracted. Also, the controller may change the pressure of the compressed gas according to a pressure profile that is set according to various usages, without constantly maintaining the pressure of the compressed gas input through the first flow path and the second flow path over time.

Also, in the above description, the first connection guide member 161 and the second connection guide member 162 that are formed similarly to the first guide member 171 and the second guide member 172 are arranged in the first connection main nozzle 131 and the second connection main nozzle 141, but a head assembly for mounting conductive balls, having a structure in which the first connection guide member 161 and the second connection guide member 162 are not provided, may be implemented. Also, a head assembly for mounting conductive balls, which includes a first connection guide member and a second connection guide member having different structures from those shown in the drawings, may be implemented.

Also, in the above description, the head assembly for mounting the conductive balls including the controller 180 is described as an example, but the head assembly for mounting conductive balls, including the head body 101, the first main nozzle 111, and the second main nozzle 121 without the controller 180, may be implemented as necessary. In this case, a user using the head assembly for mounting the conductive balls controls the pressure of the compressed gas supplied to the first main nozzle 111 and the second main nozzle 121 in an appropriate manner.

Next, a head assembly for mounting conductive balls according to a second embodiment of the present disclosure will be described below with reference to FIGS. 6 to 9.

Figure 6:
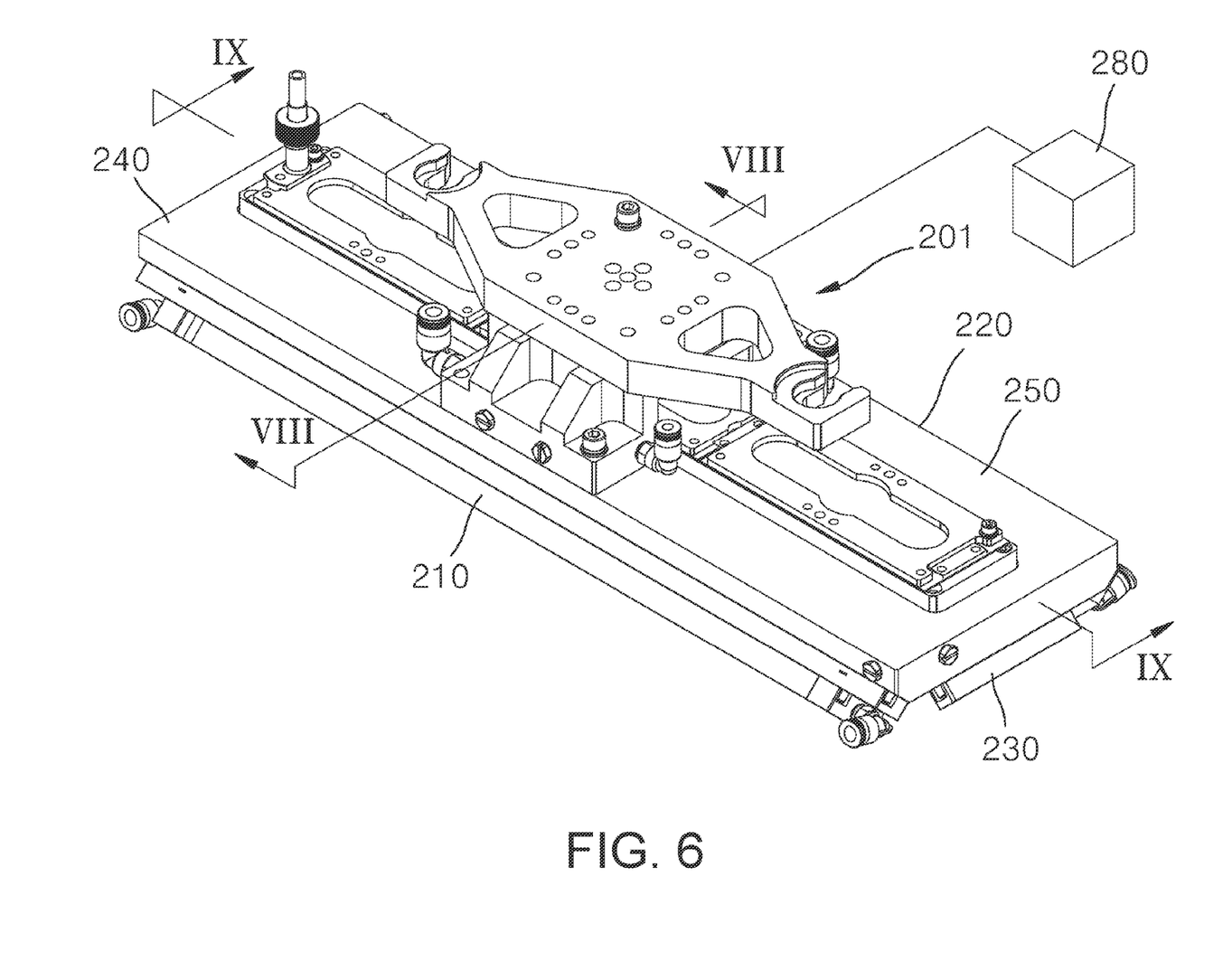
FIG. 6 is a perspective view of a head assembly for mounting conductive balls, according to a second embodiment of the present disclosure.
Figure 7:
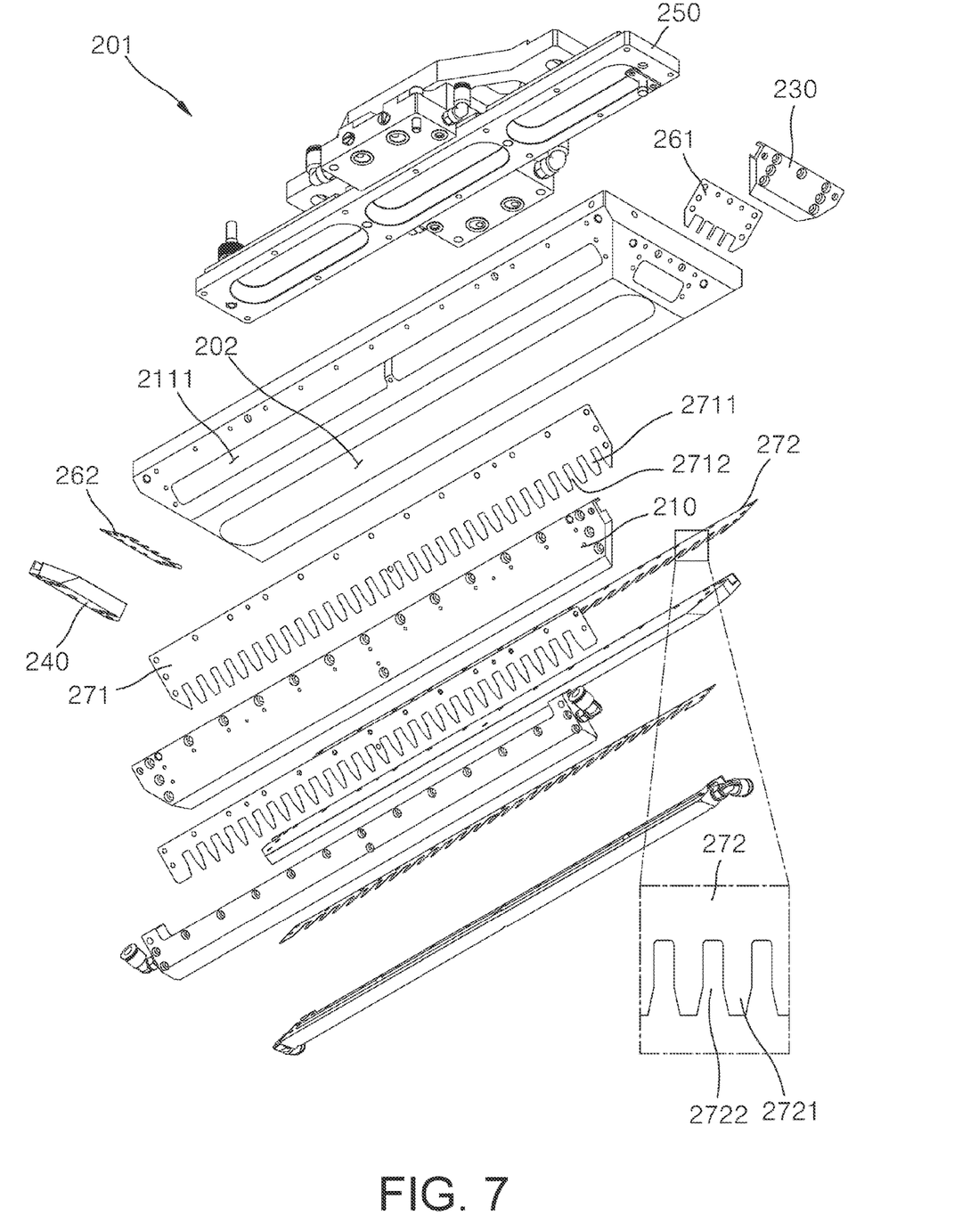
FIG. 7 is an exploded perspective view of the head assembly for mounting conductive balls shown in FIG. 6.
Figure 8:
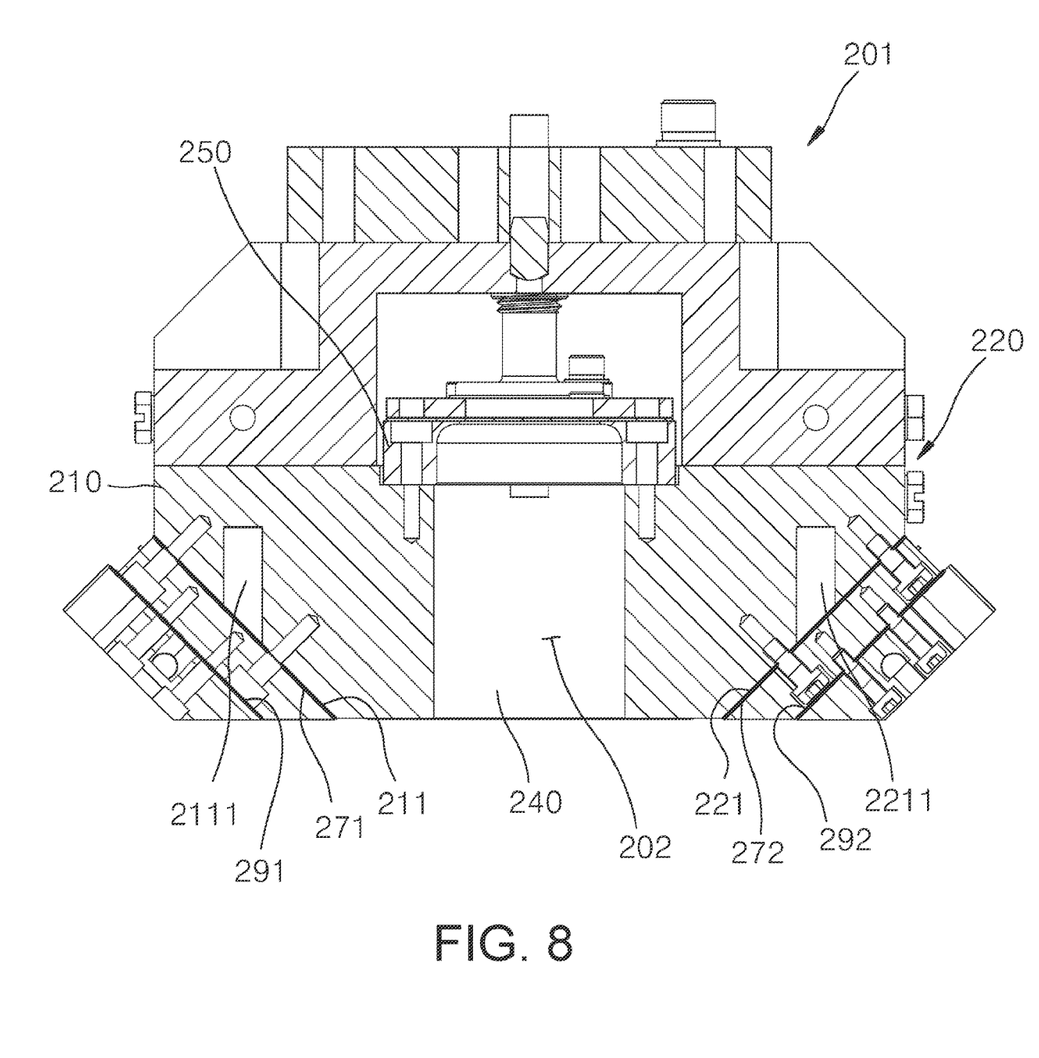
FIG. 8 is a cross-sectional view of the head assembly for mounting conductive balls, taken along line VIII-VIII of FIG. 6.
Figure 9:
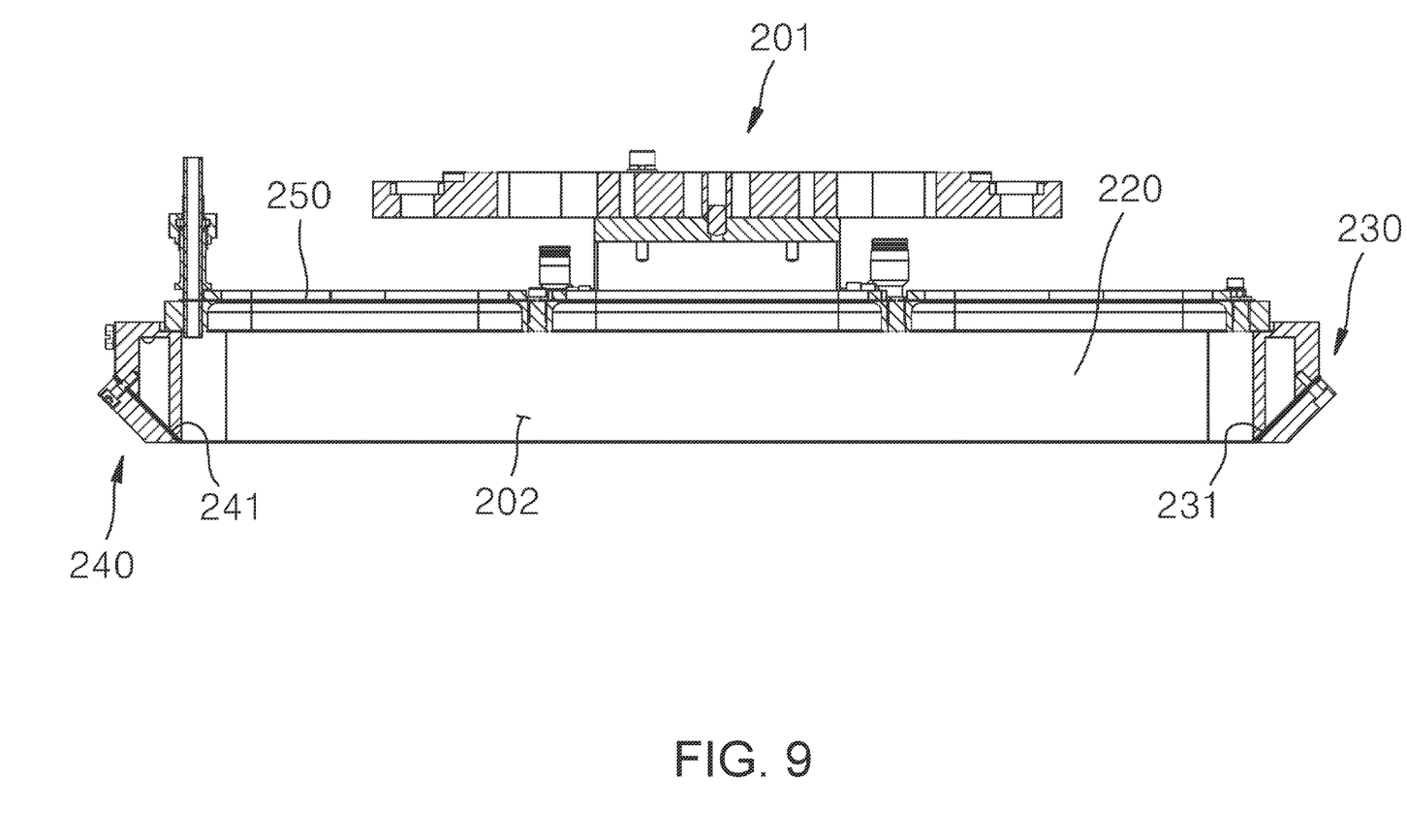
FIG. 9 is a cross-sectional view of the head assembly for mounting conductive balls, taken along line IX-IX of FIG. 6.

FIG. 6 is a perspective view of a head assembly for mounting conductive balls, according to a second embodiment of the present disclosure, FIG. 7 is an exploded perspective view of the head assembly for mounting conductive balls shown in FIG. 6, FIG. 8 is a cross-sectional view of the head assembly for mounting conductive balls, taken along line VIII-VIII of FIG. 6, and FIG. 9 is a cross-sectional view of the head assembly for mounting conductive balls, taken along line IX-IX of FIG. 6.

Referring to FIGS. 6 to 9, the head assembly for mounting the conductive balls according to the second embodiment includes a head body 201, a first main nozzle 211, and a second main nozzle 221 like in the first embodiment described above with reference to FIGS. 2 to 5, wherein the head body 201 includes a first wall member 210, a second wall member 220, a first connection member 230, a second connection member 240, a central chamber 202, and a cover member 250. Also, the head assembly for mounting conductive balls according to the second embodiment further includes the first connection member 230 and the second connection member 240. Hereinafter, descriptions about like components as those of the head assembly for mounting conductive balls according to the first embodiment are omitted, and instead, different reference numerals are added.

The head assembly for mounting conductive balls according to the second embodiment includes a first outer nozzle 291 and a second outer nozzle 292 respectively on the outside of the first main nozzle 211 and the second main nozzle 221.

The first outer nozzle 291 is formed to extend along the lengthwise direction of the first wall member 210 on the lower portion of the first wall member 210. The first outer nozzle 291 is arranged outside the first main nozzle 211. The first outer nozzle 291 is formed to be in communication with the lower surface of the first wall member 210. Through the above structure, the first outer nozzle 291 may eject the compressed gas toward the lower side of the first wall member 210.

The second outer nozzle 292 is formed to extend in a lengthwise direction of the second wall member 220 on the lower portion of the second wall member 220. The second outer nozzle 292 is arranged outside the second main nozzle 221. The second outer nozzle 292 is formed to be in communication with the lower surface of the second wall member 220. Due to the above structure, the second outer nozzle 292 may eject the compressed gas toward the lower side of the second wall member 220.

Also, the first outer nozzle 291 is formed to be inclined in a direction closer to the central chamber 202, toward the lower side of the first wall member 210, like the first main nozzle 211. The second outer nozzle 292 is formed to be inclined in a direction closer to the central chamber 202, toward the lower side of the second wall member 220, like the second main nozzle 221.

The first outer nozzle 291 and the second outer nozzle 292 assist the first main nozzle 211 and the second main nozzle 221, respectively. A flow of gas is formed from the outside to the inside of the central chamber 2020 through a gap between the head body 201 and a mask. Due to the compressed gas ejected from the first outer nozzle 291 and the second outer nozzle 292, the conductive balls in the central chamber 202 are prevented from leaking to the outside of the central chamber 202. Also, in some cases, the compressed gas ejected from the first outer nozzle 291 and the second outer nozzle 292 assists the pressure of the compressed gas ejected from the first main nozzle 211 and the second main nozzle 221 with the inducing of the flow of the conductive balls of a sufficient velocity in the central chamber 202.

Also, in some cases, a head assembly for mounting conductive balls, in which the first outer nozzle 291 and the second outer nozzle 292 are formed to be inclined as described above and the first main nozzle and the second main nozzle are formed in the vertical direction, may be implemented. In this case, the compressed gas ejected perpendicularly down from the first main nozzle and the second main nozzle naturally flows into the central chamber 202 due to the compressed gas flowing slantly from the first outer nozzle and the second outer nozzle.

A controller 280 may operate so that the pressures in the first outer nozzle 291 and the second outer nozzle 292 are maintained to be equal to each other, while maintaining the pressure in the first main nozzle 211 to be greater than that of the second main nozzle 221, as described above in the first embodiment. Also, in some cases, the head assembly for mounting the conductive balls of the embodiment may be operated so that the controller 280 maintains the pressure of the first outer nozzle 291 to be greater than that of the second outer nozzle 292. Also, the controller 280 may induce the gas flow in the central chamber 202 by maintaining the pressure in the first outer nozzle 291 to be greater than that of the second outer nozzle 292 and the pressure in the first main nozzle 211 to be equal to that of the second main nozzle 221.

Also, in the embodiment, as shown in FIG. 8, an inclined angle of the first outer nozzle 291 with respect to the first wall member 210 and an inclined angle of the second outer nozzle 292 with respect to the second wall member 220 may be equal to each other, or may be set to be different from each other so as to induce the change in the gas flow in the central chamber 202.

Also, in the embodiment, as shown in FIG. 7, a first guide member 271 and a second guide member 272 respectively include a plurality of first guide pins 2711 and a plurality of second guide pins 2721. A plurality of first guide recesses 2712 and a plurality of second guide recesses 2722 are formed by the first guide member 271 and the second guide member 272 arranged in the first main nozzle 211 and the second main nozzle 221, respectively. In the embodiment, unlike the first embodiment described above with reference to FIGS. 2 to 5, the plurality of first guide pins 2711 and the plurality of second guide pins 2721 extend in a direction perpendicular to the direction, in which the first wall member 210 and the second wall member 220 extend, toward the lower sides thereof. As described above, the direction in which the plurality of first guide pins 2711 and the plurality of second guide pins 2721 extend may be variously modified as necessary.

The head assembly for mounting the conductive balls according to the second embodiment may be variously modified, as mentioned above in the description about the head assembly for mounting the conductive balls according to the first embodiment.

In addition, an example in which the conductive balls are mounted on the mask or substrate by using the head assembly for mounting the conductive balls according to the disclosure is described above. However, the head assembly for mounting the conductive balls may be used for mounting copper pillars, as well as the conductive balls, on the mask or substrate.

According to the head assembly for mounting conductive balls of the disclosure, the gas flow for moving the conductive balls in the downward direction is formed in the chamber, and thus, small and light-weight conductive balls may be effectively mounted in the mounting recesses of the mask.

Also, because the head assembly for mounting the conductive balls is operated in the manner of inducing the conductive balls to move in the direction in which the mounting recesses are formed, the conductive balls may be rapidly and thoroughly mounted in the plurality of mounting recesses formed in the mask.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A head assembly for mounting conductive balls, which mounts the conductive balls in mounting recesses in a mask while being transported with respect to an upper surface of the mask in which the mounting recesses are formed, the head assembly comprising:
 a head body comprising a first wall member and a second wall member which are arranged to face each other and extend in parallel to each other, a first connection member and a second connection member which connect both ends of the first wall member to both ends of the second wall member, a central chamber formed by being surrounded by the first wall member, the second wall member, the first connection member, and the second connection member so that the conductive balls stay therein, and a cover member covering an upper side of the central chamber;
 a first main nozzle extending along a lengthwise direction of the first wall member on a lower portion of the first wall member so as to eject a compressed gas to a lower side in the central chamber; and
 a second main nozzle extending along a lengthwise direction of the second wall member on a lower portion of the second wall member so as to eject a compressed gas to a lower side in the second wall member,
 wherein the first main nozzle includes a plurality of first guide recesses arranged in a direction, in which the first wall member extends, so as to guide a ejecting direction of the compressed gas, and
 the second main nozzle includes a plurality of second guide recesses arranged in a direction, in which the second wall member extends, so as to guide a ejecting direction of the compressed gas, and
 wherein the plurality of first guide recesses of the first main nozzle are formed by a plurality of first guide pins arranged in the first main nozzle, and
 the plurality of second guide recesses of the second main nozzle are formed by a plurality of second guide pins arranged in the second main nozzle.

2. The head assembly of claim 1, wherein
the first main nozzle is formed to be inclined in a direction closer to the central chamber toward the lower side of the first wall member, and
the second main nozzle is formed to be inclined in a direction closer to the central chamber toward the lower portion of the second wall member.

3. The head assembly of claim 2, wherein
the first main nozzle is formed to be in communication with a lower surface of the first wall member, and
the second main nozzle is formed to be in communication with a lower surface of the second wall member.

4. The head assembly of claim 2, wherein
the first main nozzle is formed to be in communication with a wall surface of the first wall member toward the central chamber, and
the second main nozzle is formed to be in communication with a wall surface of the second wall member toward the central chamber.

5. The head assembly of claim 1, wherein
the plurality of first guide recesses of the first main nozzle are formed to be inclined so as to proceed in the direction in which the first wall member extends, toward the lower side thereof, and
the plurality of second guide recesses of the second main nozzle are formed to be inclined so as to proceed in the direction in which the second wall member extends, toward the lower side thereof.

6. The head assembly of claim 5, wherein
the plurality of first guide recesses in the first main nozzle and the plurality of second guide recesses of the second main nozzle are formed to be inclined in opposite directions to each other.

7. The head assembly of claim 1, further comprising
a controller configured to control a pressure of compressed gas supplied to each of the first main nozzle and the second main nozzle.

8. The head assembly of claim 7, wherein
the plurality of first guide recesses of the first main nozzle are formed to be inclined so as to proceed in the direction in which the first wall member extends, toward the lower side thereof, and
the plurality of second guide recesses of the second main nozzle are formed to be inclined so as to proceed in the direction in which the second wall member extends, toward the lower side thereof.

9. The head assembly of claim 8, wherein
the plurality of first guide recesses of the first main nozzle and the plurality of second guide recesses of the second main nozzle are formed to be inclined in opposite directions to each other.

10. The head assembly of claim 1, further comprising:
a first outer nozzle formed to extend in the lengthwise direction of the first wall member on the lower portion of the first wall member, at an outside of the first main nozzle so as to eject the compressed gas to the lower side of the first wall member; and
a second outer nozzle formed to extend in the lengthwise direction of the second wall member on the lower portion of the second wall member, at an outside of the second main nozzle so as to eject the compressed gas to the lower side of the second wall member.

11. The head assembly of claim 10, wherein
the first outer nozzle is formed to be inclined in a direction closer to the central chamber toward the lower side of the first wall member, and
the second outer nozzle is formed to be inclined in a direction closer to the central chamber toward the lower portion of the second wall member.

12. The head assembly of claim 11, wherein
the first outer nozzle is formed to be in communication with a lower surface of the first wall member, and
the second outer nozzle is formed to be in communication with a lower surface of the second wall member.

13. The head assembly of claim 12, further comprising
a controller configured to control the pressure of the compressed gas supplied to each of the first main nozzle, the second main nozzle, the first outer nozzle, and the second outer nozzle.

14. The head assembly of claim 1, further comprising
a first connection main nozzle and a second connection main nozzle that are respectively formed on lower portions of the first connection member and the second connection member and extend in directions in which the first connection member and the second connection member extend, so as to eject the compressed gas to the lower portions in the first connection member and the second connection member.

15. The head assembly of claim 14, wherein
the first connection main nozzle and the second connection main nozzle are formed to be connected to the first main nozzle and the second main nozzle, respectively.

16. The head assembly of claim 15, wherein the first connection member and the second connection member each have a concavely curved inner wall surface that comes into contact with the central chamber.

\* \* \* \* \*